(12) United States Patent
Liu et al.

(10) Patent No.: US 11,228,389 B2
(45) Date of Patent: *Jan. 18, 2022

(54) SCHEME FOR MULTI-CELL UL SOUNDING TRANSMISSION

(71) Applicant: HMD Global Oy, Espoo (FI)

(72) Inventors: Jing Xiu Liu, Beijing (CN); Peter Skov, Beijing (CN)

(73) Assignee: HMD GLOBAL Oy, Espoo (FI)

(*) Notice: Subject to any disclaimer, the term of this patent is extended or adjusted under 35 U.S.C. 154(b) by 30 days.

This patent is subject to a terminal disclaimer.

(21) Appl. No.: 16/843,317

(22) Filed: Apr. 8, 2020

(65) Prior Publication Data
US 2020/0235837 A1    Jul. 23, 2020

Related U.S. Application Data

(63) Continuation of application No. 13/505,392, filed as application No. PCT/CN2009/074759 on Nov. 2, 2009, now Pat. No. 10,651,962.

(51) Int. Cl.
*H04J 11/00* (2006.01)
*H04L 5/00* (2006.01)
(Continued)

(52) U.S. Cl.
CPC .......... *H04J 11/0053* (2013.01); *H04B 7/024* (2013.01); *H04L 5/0048* (2013.01);
(Continued)

(58) Field of Classification Search
CPC combination set(s) only.
See application file for complete search history.

(56) References Cited

U.S. PATENT DOCUMENTS 9,374,211 B2    6/2016    Kim
9,461,793 B2    10/2016   Kim
(Continued)

FOREIGN PATENT DOCUMENTS

| CN | 101442808 A | 5/2009 |
| EP | 2424285 A1 | 2/2012 |
| WO | WO-2010124241 A2 | 10/2010 |

OTHER PUBLICATIONS

Catt, Potevio "*Analysis of SRS Scheme for CoMP*" 3GPP TSG RAN WG1 Meeting #57bis. Los Angeles, USA, Jun. 29-Jul. 3, 2009. RI-092776.

(Continued)

*Primary Examiner* — Xavier S Wong
(74) *Attorney, Agent, or Firm* — Harrington & Smith

(57) ABSTRACT

The present invention provides a method, respective apparatuses, system and computer program product for obtaining channel state information in a coordinated multi-point transmission/reception communication network. The method comprises allocating a first sounding resource to at least one of a plurality of user equipment in a coordinated multi-point transmission/reception communication network for transmitting sounding reference signal to a base station of a serving cell, and allocating a second sounding resource to the at least one user equipment for transmitting sounding reference signal to a base station of an interfering cell, wherein the first and the second sounding resource are different from each other.

16 Claims, 3 Drawing Sheets

Single Cell SRS
 No SRS
 CoMP SRS
 Overlap of CoMP SRS and single cell SRS

(51) Int. Cl.
*H04B 7/024* (2017.01)
*H04W 72/08* (2009.01)
(52) U.S. Cl.
CPC .......... *H04L 5/0035* (2013.01); *H04L 5/0078* (2013.01); *H04W 72/082* (2013.01)

(56) References Cited

U.S. PATENT DOCUMENTS

| | | | |
|---|---|---|---|
| 2008/0045260 A1 | 2/2008 | Muharemovic et al. | 455/522 |
| 2008/0123589 A1 | 5/2008 | Lee et al. | 370/329 |
| 2009/0034468 A1* | 2/2009 | Muharemovic | H04W 72/1273 370/330 |
| 2011/0098054 A1 | 4/2011 | Gorokhov et al. | 455/452.1 |
| 2012/0076037 A1 | 3/2012 | Noh | 370/252 |
| 2012/0127932 A1 | 5/2012 | Gao et al. | 370/329 |
| 2012/0129550 A1 | 5/2012 | Hannan | 455/456.1 |
| 2012/0129561 A1 | 5/2012 | Peng et al. | 455/513 |
| 2012/0170510 A1* | 7/2012 | Kim | H04L 5/0053 370/315 |
| 2013/0039319 A1 | 2/2013 | Shi | 370/329 |
| 2013/0250897 A1 | 9/2013 | Dinan | 370/329 |
| 2016/0192361 A1 | 6/2016 | Dinan | 370/329 |

OTHER PUBLICATIONS

Pantech & Curitel "*Further Consideration on Enhanced SRS for CoMP/non-CoMP User Group*" 3GPP TSG RAN#58b. Miyazaki, Japan, Oct. 12-Oct. 16, 2009, R1-093796.
"3$^{rd}$ Generation Partnership Project; Technical Specification Group Radio Access Network; Evolved Universal Terrestrial Radio Access (E-UTRA) Radio Resource Control (RRC); Protocol specification (Release 9)", 3GPP Standard; 3GPP TS 36.331, No. V9.0.0, Sep. 1, 2009, pp. 1-205.

* cited by examiner

SCHEME FOR MULTI-CELL UL SOUNDING TRANSMISSION

CROSS-REFERENCE TO RELATED APPLICATIONS

This application is a continuation of U.S. patent application Ser. No. 13/505,392, which itself is a national stage application under 35 U.S.C. § 371 of PCT/CN2009/074759, filed on Nov. 2, 2009, the disclosures of which are incorporated by reference in their entirety.

Scheme for multi-cell UL sounding transmission for obtaining channel state information in a coordinated multi-point transmission/receiving communication network.

FIELD OF THE INVENTION

The present invention relates to the field of obtaining channel state information in a coordinated multipoint transmission/receiving communication network, and more particularly, in a mobile communication network like a Long Term Evolution advanced (LTE-A) communication network. Additionally, the invention relates to apparatuses in a communication network, like e.g. a base station, and more particularly, to a (enhanced) node B in a LTE-A communication network and user equipment. Moreover, the invention relates to a program code and a computer readable medium carrying the program code.

BACKGROUND

The coordinated multipoint transmission and reception (CoMP) concept is an emerging technology in communication networks. However, in emerging technologies, there are always also some problems that have to be dealt with.

A base station (node B) in a network cell needs to get channel state information from user equipment (UE) in the respective cell. In the coordinated multipoint transmission and reception (CoMP) concept, sound reference signals (SRS) are used in order to obtain these channel state information. Getting channel state information from interfering cells, i.e. overlapping cells, by using sound reference signals (SRS) in uplink (UL), however, will increase the load on the SRS resources as the resource has to be reserved in the interfering cell as well.

In certain cases, SRS is transmitted in the interfering cell only for the base station to be able to estimate antenna correlation. For such purpose, there is no need to send sounding very often. However, for the own cell, there could be a need for more often sounding transmissions to support UL channel aware packet scheduling or short term beam forming in time division duplex (TDD).

Thus, there arises the problem of increased overhead with COMP sounding.

SUMMARY OF THE INVENTION

In order to solve this problem, according to the present invention, there is provided method of obtaining channel state information from user equipment in a communication network as defined in the independent claims.

According to an aspect of the invention there is provided a method comprising:
allocating a first sounding resource to at least one of a plurality of user equipment in a coordinated multi-point transmission/reception communication network for transmitting sounding reference signal to a base station of a serving cell; and
allocating a second sounding resource to the at least one user equipment for transmitting sounding reference signal to at least one base station of an interfering cell;
the first and the second sounding resource being different from each other.

According to further refinements of the invention as defined under the above aspects:
the first a second sounding resource are cell specific, and
the second sounding resource is a sounding resource from the interfering cell,
each of the first and second sounding resource are separately set based on predetermined configuration parameters,
the first sounding resource is set based on predetermined configuration parameters and the second sounding resource is selected from an allocated transmission time interval of the first sounding resource based on specific parameters of the second sounding resource in time domain,
the second sounding resource is set based on predetermined configuration parameters and the first sounding resource is selected from an allocated transmission time interval of the second sounding resource based on specific parameters of the first sounding resource in time domain,
the predetermined configuration parameters comprise one or more of periodicity and offset in time domain, initial physical resource block, bandwidth and frequency hopping mode in frequency domain.

According to another aspect of the invention there is provided an apparatus comprising:
an controller configured to allocate a first sounding resource to at least one of a plurality of user equipment in a coordinated multi-point transmission/reception communication network for transmitting sounding reference signal to a base station of a serving cell, and configured to allocate a second sounding resource to the at least one user equipment for transmitting sounding reference signal to at least one base station of an interfering cell;
the first and the second sounding resource being different from each other.

According to further refinements of the invention as defined under the above aspects:
the controller is configured to set each of the first and second sounding resource separately based on predetermined configuration parameters,
the controller is configured to set the first sounding resource based on predetermined configuration parameters and to select the second sounding resource from an allocated transmission time interval of the first sounding resource based on specific parameters of the second sounding resource in time domain,
the controller is configured to set the second sounding resource based on predetermined configuration parameters and to select the first sounding resource from an allocated transmission time interval of the second sounding resource based on specific parameters of the first sounding resource in time domain,
the predetermined configuration parameters comprise one or more of periodicity and offset in time domain, initial physical resource block, bandwidth and frequency hopping mode in frequency domain.

According to a further aspect of the invention there is provided an apparatus comprising:

a receiver configured to receive allocation information of a first sounding resource for transmitting sounding reference signal to a base station of a serving cell in a coordinated multi-point transmission/reception communication network, and configured to receive allocation information of a second sounding resource for transmitting sounding reference signal to at least one base station of an interfering cell in a coordinated multi-point transmission/reception communication network;

the first and the second sounding resource being different from each other.

According to a still further aspect of the invention there is provided a system comprising apparatuses as defined above.

According to a further aspect of the invention there is provided a computer program product including a program for a processing device, comprising software code portions for performing, when the program is run on a processing device, any of the steps of the methods as defined above.

According to a further aspect of the invention there is provided a computer program product as defined above, wherein the computer program product comprises a computer-readable medium on which the software code portions are stored.

According to a further aspect of the present invention there is provided computer program product as defined above, wherein the program is directly loadable into an internal memory of the processing device.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION

In the following, embodiments of the present invention are described by referring to general and specific examples of the embodiments. It is to be understood, however, that the description is given by way of example only, and that the described embodiments are by no means to be understood as limiting the present invention thereto.

Figure 1:
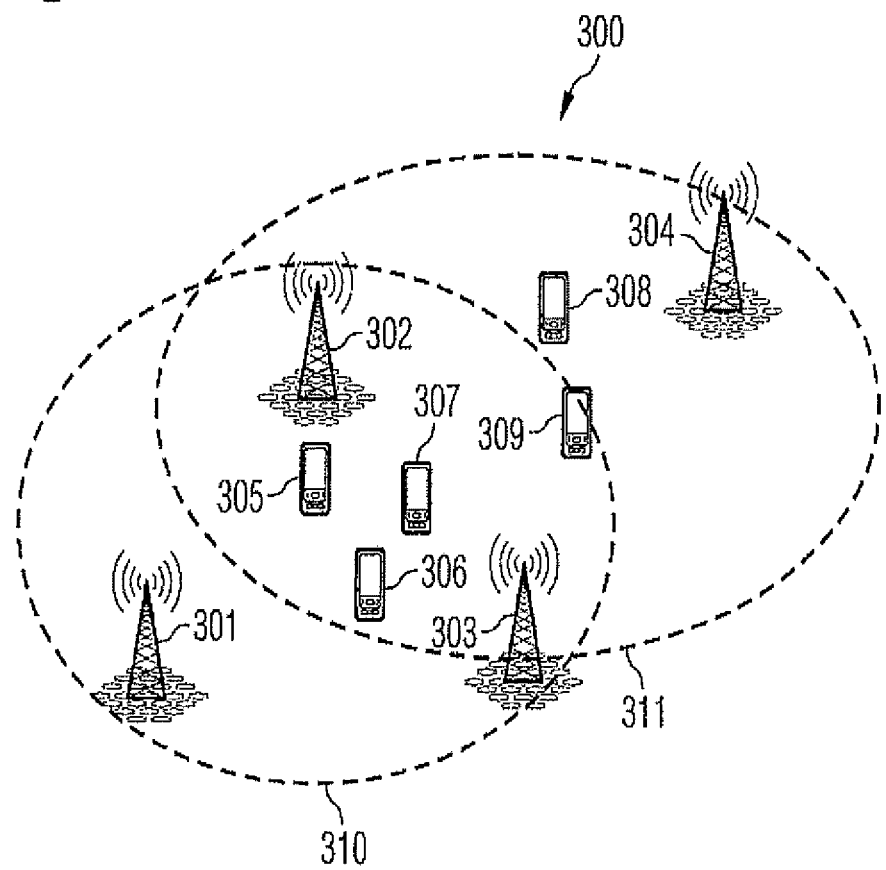
FIG. 1 shows an exemplary communication network to which the present invention is applicable.

FIG. 1 shows an example of a communication network to which the present invention is applicable. According to the example shown in FIG. 1, the communication network is a cellular mobile communication network.

The communication network 300 comprises two CoMP sets 310 and 311 each comprising corresponding base stations 301, 302, 303 and 302, 303, 304, respectively. A CoMP set refers to an UE specific set of base stations from which the UE is receiving/transmitting jointly. Furthermore, a plurality of network elements 305, 306, 307, 308 and 309 are schematically depicted in FIG. 1. However, the communication network may of course comprise a much higher number of base stations and network elements, which may be formed by mobile phones, computers, PDAs, base stations of cordless telephones or the like, i.e. every communication system which is suitable for a wireless communication. Each of the plurality of network elements is a member of a CoMP set. Each CoMP set may have of course more than one BS assigned to. One of the base stations of each CoMP set may form the serving base station. In FIG. 1, CoMP set 310 includes base stations 301, 302, 303, and UEs 305, 306, 307. CoMP set 311 includes base stations 302, 303, 304, and UEs 308, 309.

For the purpose of the following description of the invention, it is assumed that in FIG. 1 base station 302 is the serving base station for UE 305, for example.

As previously described, UE 305 sends SRS sounding to cells of base stations 301 or 303, i.e. the interfering cell, only in certain cases to enable the base stations to estimate antenna correlation. More often, UE 305 sends SRS sounding to the base station 302, which is the serving base station, to support UL channel aware packet scheduling or short term beam forming.

Currently, however, when sending SRS sounding for the own cell to the serving base station 302, the SRS resources also have to be reserved in the interfering cell, which increases the load on the SRS resources.

In order to solve this problem, according to the present invention, there is proposed a dual code sounding scheme to obtain channel state information from non serving sectors, i.e. interfering cells.

In particular, two sounding resources are allocated to the UE 305. That is, channel state information that is only relevant within the own cell, i.e. for the serving base station 302, is sent via a specific resource only to the serving base station in order to decrease the load on the SRS resources of the interfering cell (also referred to as a single cell SRS hereinafter). Further, information that is relevant for all base stations in the CoMP set are sent via another resource to all base stations in the CoMP set (also referred to as a CoMP SRS hereinafter)

One resource can be taken from the resources used in the interfering cell where base station antenna correlation is needed. This can be transmitted with a certain periodicity/offset. The other resource can be taken from the single cell group which can be transmitted with another periodicity/offset.

The resource used for sounding in interfering cell could be replaced by a generalized CoMP sounding resource which is generated based on collaboration area ID and is reserved in all the cells of the collaboration area.

In the following, three options for implementing the invention will be described.

In the first option, the SRS for CoMP (generated based on multi-cell group of codes) and SRS for single-cell are configured by anchor base station (and/or serving eNB), e.g. an enhanced Node B (eNB), separately, in which each SRS has its own SRS configuration parameters, e.g. periodicity and offset in time domain, initial PRB and bandwidth and frequency hopping mode (if enabled) in frequency domain.
  a) When the resource of two kinds of SRS conflict in time domain, the UE can act based on pre-determined criterion, e.g. discard single-cell SRS if CoMP is more important for this UE or for the whole cell;
  b) Another case is that although two SRS conflict in time domain, but they are not in the same PRB in frequency domain,
    i. then both these two SRS are transmitted together, each with only half transmit power of per-determined power allocation;
    ii. or only one SRS is transmitted based on one of the criteria as described in a).
  c) Required signaling:
    i. Single cell SRS
      1. Parameters for time domain
        a) $T_{SFC}$ is UE-specific periodicity of SRS transmission;
        b) $\Delta_{SFC}$ is SRS subframe offset.
      2. Parameters for frequency domain
        a) The cell-specific parameter srs-BandwidthConfig $c_{SRS} \in \{0, 1, 2, 3, 4, 5, 6, 7\}$ and the UE-specific parameter srs-Bandwidth $B_{SRS} \in \{0, 1, 2, 3\}$ are given by higher layers;
        b) $k_{TC} \in \{0, 1\}$ is the parameter transmissionComb provided by higher layers for the UE;
        c) The frequency hopping of the sounding reference signal is configured by the parameter srs-HoppingBandwidth, $b_{hop} \in \{0, 1, 2, 3\}$, provided by higher layers;
        d) parameter freqDomainPosition $n_{RRC}$ is given by higher layers for the UE.
      3. Parameters for sequence
        a) $n^{cs}_{SRS}$: determine cyclic shift parameter, configured for each UE by high layer, range $\{0, 1, 2, 3, 4, 5, 6, 7\}$;
        b) u is the PUCCH sequence-group number, v is base sequence number.
    ii. COMP SRS
      1. Parameters for time domain
        a) $T_{SFC}$ is UE-specific periodicity of SRS transmission;
        b) $\Delta_{SFC}$ is SRS subframe offset.
      2. Parameters for frequency domain
        a) The cell-specific parameter srs-BandwidthConfig $C_{SRS}\{0, 1, 2, 3, 4, 5, 6, 7\}$ and the UE-specific parameter srs-Bandwidth $B_{SRS} \in \{0, 1, 2, 3\}$ are given by higher layers;
        b) $k_{TC} \in \{0, 1\}$ is the parameter transmissionComb provided by higher layers for the UE;
        c) The frequency hopping of the sounding reference signal is configured by the parameter srs-HoppingBandwidth, $b_{hop} \in \{0, 1, 2, 3\}$, provided by higher layers;
        d) parameter freqDomainPosition $n_{RRC}$ is given by higher layers for the UE.
      3. Parameters for sequence
        a) $n^{cs}_{RSR}$: determine cyclic shift parameter, configured for each UE by high layer, range $\{0, 1, 2, 3, 4, 5, 6, 7\}$;
        b) u is the PUCCH sequence-group number, v is base sequence number.

In the second option, the single-cell SRS is configured as defined in LTE Release 8 (R8), and SRS for CoMP is selected from the allocated transmission time interval (TTI) for single-cell SRS based on some CoMP-specific parameters including density and offset in time domain,
  a) Required signaling:
    i. Single cell SRS
      1. Parameters for time domain
        a) $T_{SFC}$ is UE-specific periodicity of SRS transmission;
        b) $\Delta_{SFC}$ is SRS subframe offset.
      2. Parameters for frequency domain
        a) The cell-specific parameter srs-BandwidthConfig $c_{SRS} \in \{0, 1, 2, 3, 4, 5, 6, 7\}$ and the UE-specific parameter srs-Bandwidth $B_{SRS} \in \{0, 1, 2, 3\}$ are given by higher layers;
        b) $k_{TC} \in \{0, 1\}$ is the parameter transmissionComb provided by higher layers for the UE;
        c) The frequency hopping of the sounding reference signal is configured by the parameter srs-HoppingBandwidth, $b_{hop} \in \{0, 1, 2, 3\}$, provided by higher layers;
        d) parameter freqDomainPosition $n_{RRC}$, is given by higher layers for the UE.
      3. Parameters for sequence
        a) $n^{cs}_{SRS}$: determine cyclic shift parameter, configured for each UE by high layer, range $\{0, 1, 2, 3, 4, 5, 6, 7\}$;
        b) u is the PUCCH sequence-group number, v is base sequence number.
    ii. CoMP SRS
      $D_{SRS}$ is the density of CoMP SRS within one period of single cell SRS, and the value could be either larger than 1, e, g. $\{1, 2, 3 \ldots\} \ldots$ or smaller than 1, e.g. $\{0.2, 0.5, \ldots\}$;
      2. $T_{offset}$ is CoMP SRS subframe offset within one period of single cell SRS.

In the third option, the CoMP SRS is configured as defined in R8, and SRS for single-cell is selected from the allocated TTI for CoMP SRS based on some single-cell-specific parameters including density and offset in time domain.
  a) Required signalling:
    i. CoMP SRS
      1. Parameters for time domain
        a) $T_{SFC}$ is UE-specific periodicity of SRS transmission;
        b) $\Delta_{SFC}$ is SRS subframe offset.
      2. Parameters for frequency domain
        a) The cell-specific parameter srs BandwidthConfig $C_{SRS} \in \{0, 1, 2, 3, 4, 5, 6, 7\}$ and the UE-specific parameter srs-Bandwidth $B_{SRS} \in \{0, 1, 2, 3\}$ are given by higher layers;
        b) $k_{TC} \in \{0, 1\}$ is the parameter transmissionComb provided by higher layers for the UE;
        c) The frequency hopping of the sounding reference signal is configured by the parameter srs-HoppingBandwidth, $b_{hop} \in \{0, 1, 2, 3\}$, provided by higher layers;
        d) parameter freqDomainPosition $n_{RRC}$ is given by higher layers for the UE.
      3. Parameters for sequence
        a) $n^{cs}_{SRS}$: determine cyclic shift parameter, configured for each UE by high layer, range $\{0, 1, 2, 3, 4, 5, 6, 7\}$;
        b) u is the PUCCH sequence-group number, v is base sequence number.
    ii. Single-cell SRS
      1. $D_{SRS}$ is the density of single-cell SRS within one period of CoMP SRS, and the value could be either larger than 1, e, g. {1, 2, 3 ... }, ... or smaller than 1, e.g. {0.2, 0.5, ... };

2. $T_{offset}$ is single-cell SRS subframe offset within one period of CoMP SRS.

Figure 2:
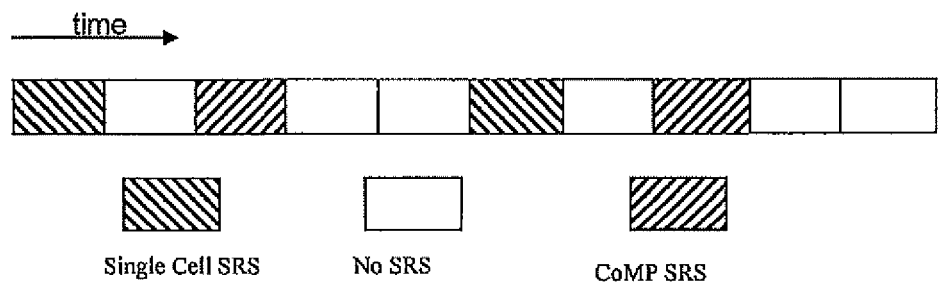
FIG. 2 shows a schematic example for implementing the method according to the present invention according to a first option.

FIG. 2 shows a schematic example for option 1. In FIG. 1, the $T_{SFC}/\Delta_{SFC}$ for the single cell SRS is 5 (subframes)/0 (subframes) and those for CoMP is 5 (subframes)/2 (subframes). As derivable from the FIG. 2, no conflict between two kinds of SRS occurs according to option 1.

Figure 3:
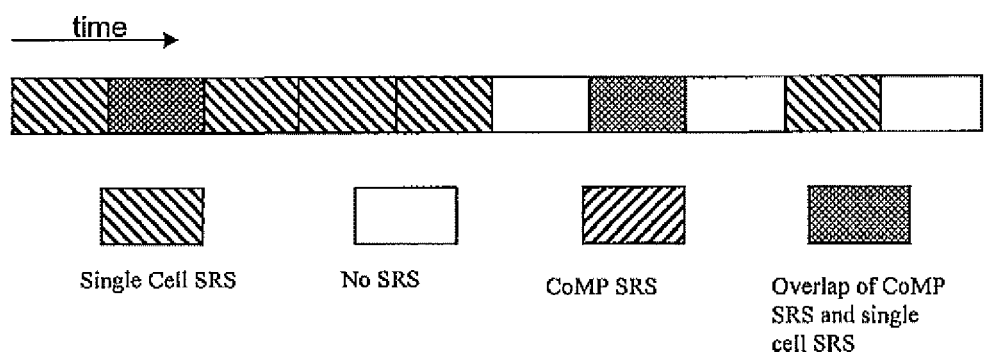
FIG. 3 shows a schematic example for implementing the method according to the present invention according to a second option.

FIG. 3 shows one schematic example for option 2, in which the $T_{SFC}/\Delta_{SFC}$ for single cell is 10 (subframes)/{0, 1, 2, 3, 4, 6, 8} (subframes). For CoMP, $D_{SRS}=2$ and $T_{offset}=\{1, 6\}$.

In this case, there occurs a conflict between the single cell SRS and the CoMP SRS in the time domain, i.e. in the second and seventh subframe. Thus, as previously mentioned, the UE can act based on predetermined criterion, e.g. discard the single cell SRS if the CoMP SRS is more important for the US or for the whole cell.

Figure 4:
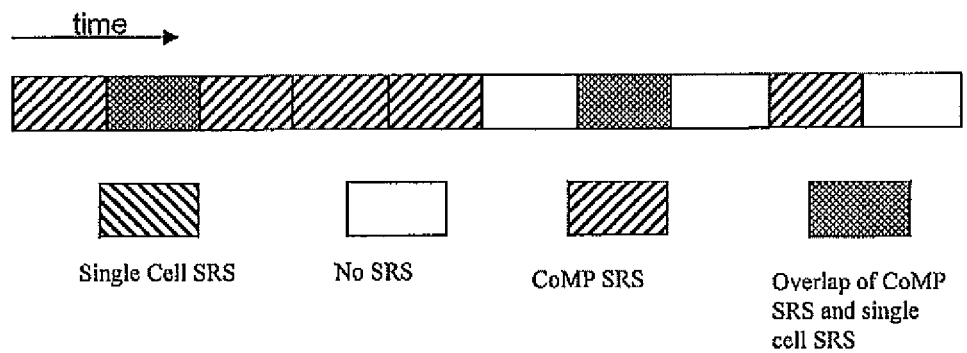
FIG. 4 shows a schematic example for implementing the method according to the present invention according to a third option.

FIG. 4 shows one schematic example for option 3, in which the $T_{SFC}/\Delta_{SFC}$ for CoMP is 10 (subframes)/{0, 1, 2, 3, 4, 6, 8} (Subframes). For single cell, $D_{SRS}=2$ and $T_{offset}=\{1, 6\}$.

In this case, there also occurs a conflict between the single cell SRS and the CoMP SRS in the time domain, i.e. in the second and seventh subframe. Thus, as previously mentioned, the UE can act based on predetermined criterion, e.g. discard the single cell SRS if the CoMP SRS is more important for the US or for the whole cell.

The advantage of the method according to the present invention is that there is no need to design new SRS configuration parameters in the case of option 1, as described above. Further, for two kinds of SRS, there is provided a flexible and independent configuration (options 2 and 3, as described above).

Figure 5:
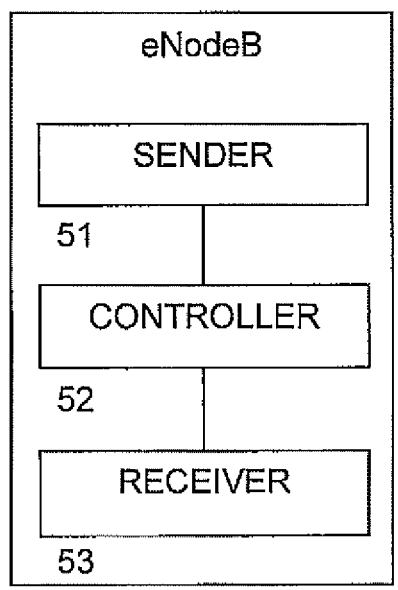
FIG. 5 shows a schematic example of an apparatus, which may be a network control element such as an eNode B, according to an example of the present invention.

FIG. 5 shows an apparatus, which may be a network control element such as an eNode B, according to an example of the present invention. The apparatus comprises a sender 51, a controller 52 and a receiver 53. The receiver 53 receives channel state information provided from the UE and the controller 52 processes the channel state information. The sender 51 sends information regarding the allocated resources to the UE. The controller further controls all processes of the apparatus.

Figure 6:
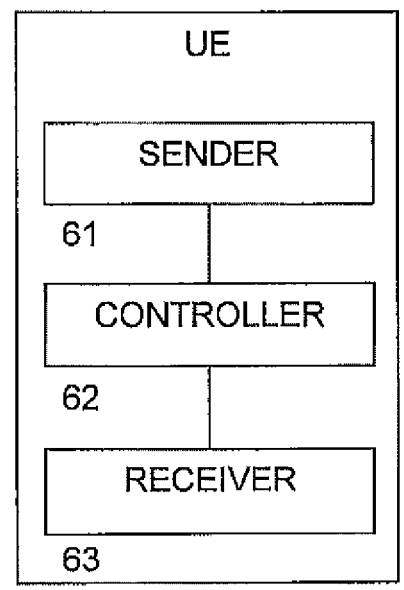
FIG. 6 shows a schematic example of an apparatus, which may be user equipment, according to an example of the present invention.

FIG. 6 shows an apparatus, which may be user equipment (UE), according to an example of the present invention. The apparatus comprises a sender 61, a controller 62 and a receiver 63. The receiver 63 receives information from the network control element regarding the allocated resources and the sender 61 sends SRS to the network control element based on the allocated resource. The controller controls all processes of the apparatus.

It is noted that in both apparatuses, the sender 51 (or 61), the controller 52 (or 62) and the receiver 53 (or 63) may be provided as one unit. That is, for example a processor of an Node-B or of a UE may be configured to perform the functions of these elements or a part thereof.

In the foregoing exemplary description of the base station and the user equipment, only the units that are relevant for understanding the principles of the invention have been described using functional blocks. The base station and the user equipment may comprise further units that are necessary for their operation as base station and user equipment, respectively. However, a description of these units is omitted in this specification. The arrangement of the functional blocks of the devices is not construed to limit the invention, and the functions may be performed by one block or further split into sub-blocks.

For the purpose of the present invention as described herein above, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, UE, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and general and specific examples described above are provided for illustrative purposes only and are in no way intended that the present invention is restricted thereto. Rather, it is the intention that all variations and modifications be included which fall within the scope of the appended claims.

What is claimed is:

1. A method comprising:
receiving a first sounding resource and a second sounding resource at a receiver, wherein the first sounding resource is allocated for transmitting a sounding reference signal to a base station of a serving cell, wherein the second sounding resource is allocated for transmitting a sounding reference signal to at least one base station of an interfering cell, wherein the first and the second sounding resources are different from each other in the coordinated multi-point transmission/reception communication network, wherein the first and second sounding resources are each set separately based on predetermined configuration parameters, and wherein in response to a conflict in a time domain of the first sounding reference signal and the second sounding reference signal, the first sounding reference signal is discarded based on a predetermined criterion.

2. The method according to claim 1, wherein the first and second sounding resources are cell specific, and wherein the second sounding resource is a sounding resource from the interfering cell.

3. The method according to claim 1, wherein the first sounding resource is set based on predetermined configuration parameters and the second sounding resource is selected from an allocated transmission time interval of the first sounding resource based on specific parameters of the second sounding resource in time domain.

4. The method according to claim 1, wherein the second sounding resource is set based on predetermined configuration parameters and the first sounding resource is selected from an allocated transmission time interval of the second sounding resource based on specific parameters of the first sounding resource in time domain.

5. The method according to claim 1, wherein the predetermined configuration parameters comprise one or more of periodicity and offset in time domain, initial physical resource block, bandwidth and frequency hopping mode in frequency domain.

6. An apparatus comprising:

a controller configured to allocate a first sounding resource and a second sounding resource to at least one of a plurality of user equipment in a coordinated multi-point transmission/reception communication network, wherein the first sounding resource is allocated for transmitting a sounding reference signal to a base station of a serving cell, wherein the second sounding resource is allocated for transmitting a sounding reference signal to at least one base station of an interfering cell, wherein the first and the second sounding resource are different from each other in the coordinated multi-point transmission/reception communication network, wherein the first and second sounding resources are each set separately based on predetermined configuration parameters, and wherein in response to a conflict in a time domain of the first sounding reference signal and the second sounding reference signal, the first sounding reference signal is discarded based on a predetermined criterion.

7. The apparatus according to claim 6, wherein the controller is configured to set the first sounding resource based on predetermined configuration parameters and to select the second sounding resource from an allocated transmission time interval of the first sounding resource based on specific parameters of the second sounding resource in a time domain.

8. The apparatus according to claim 6, wherein the controller is configured to set the second sounding resource based on predetermined configuration parameters and to select the first sounding resource from an allocated transmission time interval of the second sounding resource based on specific parameters of the first sounding resource in a time domain.

9. The apparatus according to claim 6, wherein the predetermined configuration parameters comprise one or more of periodicity and offset in time domain, initial physical resource block, bandwidth and frequency hopping mode in frequency domain.

10. The apparatus according to claim 6, wherein:

the controller comprises at least one processor; and the apparatus further comprises at least one memory comprising executable software code portions for execution by the at least one processor, wherein the at least one processor, in response to execution of the executable software code portions, causes the apparatus to perform the allocating of the first sounding resource and the second sounding resource.

11. The apparatus according to claim 10, wherein the at least one processor, in response to execution of the executable software code portions, causes the apparatus to perform, in response to the conflict in the time domain of the first sounding reference signal and the second sounding reference signal, the first sounding reference signal to be discarded based on the predetermined criterion.

12. An apparatus comprising:

a receiver configured to receive allocation information of a first sounding resource and a second sounding resource, wherein the first sounding resource is allocated for transmitting a sounding reference signal to a base station of a serving cell in a coordinated multi-point transmission/reception communication network, wherein the second sounding resource is allocated for transmitting a sounding reference signal to at least one base station of an interfering cell in the coordinated multi-point transmission/reception communication network, wherein the first and the second sounding resources being different from each other in the coordinated multi-point transmission/reception communication network, and wherein the first and second sounding resources are each set separately based on predetermined configuration parameters, and wherein in response to a conflict in a time domain of the first sounding reference signal and the second sounding reference signal, the first sounding reference signal is discarded based on a predetermined criterion.

13. The apparatus according to claim 12, wherein:

the apparatus further comprises at least one memory comprising executable software code portions for execution by the at least one processor, wherein the at least one processor, in response to execution of the executable software code portions, causes the apparatus to perform the receiving the allocation information of the first sounding resource and the second sounding resource.

14. The apparatus according to claim 13, wherein the at least one processor, in response to execution of the executable software code portions, causes the apparatus to perform, in response to the conflict in the time domain of the first sounding reference signal and the second sounding reference signal, the first sounding reference signal to be discarded based on the predetermined criterion.

15. A computer program product embodied on a non-transitory computer-readable medium, in which a computer program for a processing device is stored, comprising software code portions for performing the steps of claim 1 when the program is run on the processing device.

16. The computer program product according to claim 11, wherein the program is directly loadable into an internal memory of the processing device.

\* \* \* \* \*